United States Patent [19]

Matsuura et al.

[11] Patent Number: 4,882,722

[45] Date of Patent: Nov. 21, 1989

[54] FRONT LOADING DISK PLAYER

[75] Inventors: Ryo Matsuura; Nobuyuki Isobe; Masao Kase, all of Saitama, Japan

[73] Assignee: Pioneer Electronic Corporation, Tokyo, Japan

[21] Appl. No.: 334,765

[22] Filed: Apr. 10, 1989

Related U.S. Application Data

[63] Continuation of Ser. No. 102,219, Sep. 29, 1987, abandoned.

[30] Foreign Application Priority Data

Sep. 29, 1986 [JP] Japan ................................ 61-230724
Sep. 29, 1986 [JP] Japan ................................ 61-230725

[51] Int. Cl.⁴ ...................... G11B 15/30; G11B 15/44
[52] U.S. Cl. ................................................. 369/75.2
[58] Field of Search ......................................... 369/75.2

[56] References Cited

U.S. PATENT DOCUMENTS

| | | | |
|---|---|---|---|
| 4,337,533 | 6/1982 | Ando et al. | 369/75.2 |
| 4,530,081 | 7/1985 | Sakurai et al. | 369/75.2 |
| 4,616,357 | 10/1986 | Nakayama | 369/75.2 |
| 4,661,940 | 4/1987 | Camerik | 369/75.2 |
| 4,682,319 | 7/1987 | Einhaus | 369/75.2 |
| 4,697,259 | 9/1987 | Takanashi | 369/75.2 |
| 4,715,025 | 12/1987 | Eijsermans | 369/75.2 |
| 4,796,251 | 1/1989 | Hirano | 369/75.2 |

FOREIGN PATENT DOCUMENTS

| | | | |
|---|---|---|---|
| 822174 | 12/1937 | France | 369/75.2 |
| 56-58167 | 5/1981 | Japan | 369/75.2 |

*Primary Examiner*—Steven L. Stephan
*Attorney, Agent, or Firm*—Sughrue, Mion, Zinn, Macpeak & Seas

[57] ABSTRACT

A front loading disk player is disclosed which comprises a housing; a playing unit including a turn table; a carrier for bearing a disk to be played; carrier taking in and out unit for moving the carrier out of and into the housing through an opening formed in the housing, to permit the loading and unloading of the disk; and a door provided swingably to open and close the opening. The carrier taking in and out unit comprises movable members which are movably provided in the housing; a drive force applying unit for applying a drive force to the movable members; and a carrier moving mechanism for moving the carrier horizontally and vertically with movement of the movable members. The door is opened and closed by the carrier taking in and out unit.

3 Claims, 9 Drawing Sheets

FRONT LOADING DISK PLAYER

This is a continuation of application Ser. No. 07/102,219 filed 9/29/87, now abandoned.

BACKGROUND OF THE INVENTION

This invention relates to disk players, and more particularly to a front loading disk player with disk conveying mechanism for automatically conveying a disk to a disk playing position.

A front loading disk player is well known in the art in which an audio disk having acoustic grooves on its surface or a digital audio disk on which PCM signals have been recorded is placed on a carrier, which is movable into and out of the player housing, and taken in its entirety in the player housing so that the upper surface of the disk player may be freely utilized, for instance, for supporting objects.

A front loading disk player of this type which is provided with carrier taking in and out means for automatically moving the carrier out of and into the player housing to simplify a disk loading and unloading operation has been proposed in the art. In the disk player, the disk placed on the carrier outside the player housing is moved in two directions, horizontal and vertical directions, to position it at its playing position, i.e., over the turn table. For this purpose, heretofore the carrier is made up of two bearing members: a tray which can reciprocate horizontally of the player housing, and a container which can reciprocate vertically of the tray, and which can go out of the player housing together with the tray and support the disk in cooperation with the tray.

In the operation of the conventional front loading disk player thus constructed, the tray together with the container is moved horizontally into the player housing so as to be fixed to the player housing, and then only the container is moved vertically so that the disk is transferred to the turn table from the container. For this operation, the disk player is provided with an intricate operation switching mechanism for switching the operations of the tray and the container. Furthermore, as was described above, the carrier comprises the two parts, the tray and the container. Therefore, the disk player is, as a whole, large in the number of components and high in manufacturing cost.

On the other hand, the disk player is provided with a door for closing an opening in the player housing through which the carrier is taken out of the housing, so that the carrier is moved into and out of the player housing while rubbing the door, thus producing abnormal sounds.

SUMMARY OF THE INVENTION

In view of the foregoing, an object of this invention is to provide a front loading disk player low in manufacturing cost in which no abnormal sound is produced when the carrier is moved in and out of the player housing.

The front loading disk player according to the invention comprises: a carrier for bearing a disk to be player; and carrier taking in and out means for moving the carrier into and out of a player housing, to permit the loading and unloading of the disk. The carrier is a single member. The carrier taking in and out means comprises: movable members provided movably in the player housing; drive force applying means for applying a drive force to the movable members; and carrier moving means for moving horizontally and vertically with movement of the movable members. A door for closing an opening in the player housing through which the carrier is protruded out of the player housing is operated (opened and closed) by the carrier taking in and out means.

DETAILED DESCRIPTION OF THE PREFERRED EMBODIMENTS

A front loading disk player, which is one embodiment of this invention, will be described with reference to the accompanying drawings.

Figure 1:
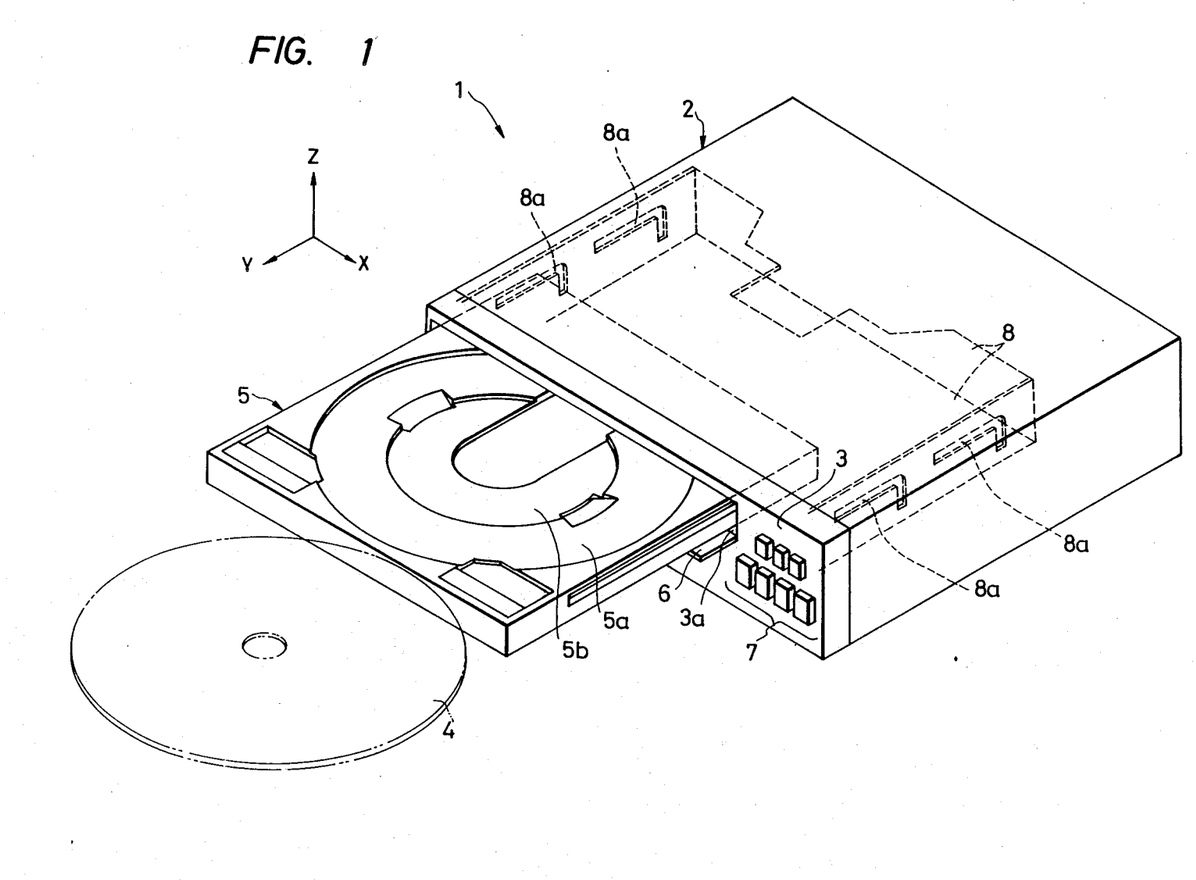
FIG. 1 is a perspective view showing a front loading disk player according to this invention in its entirety.

In FIG. 1, reference numeral 1 designates the front loading disk player of the invention.

As shown in FIG. 1, the front wall of a player housing 2, namely, a front panel 3 has a horizontally extended rectangular opening 3a through which a carrier 5 bearing a disk 4 to be played can protrude out of the housing 2. In FIG. 1, the forward direction is the direction of the arrow Y, the leftward direction is the direction of the arrow X, and the upward direction is the direction of the arrow Z. The opening 3a is provided with a plate-shaped door 6. The door 6 is used to close the opening 3a. Several switches 7 for operating the disk player are provided on the front panel 3.

A chassis 8 of steel plate is built in the player housing 2. Playing means including a turn table and optical pickup means (described later) is installed on the chassis 8.

Now, the carrier 5, and means for moving the carrier 5 out of and into the player housing 2 (hereinafter referred to as "carrier taking in and out means", when applicable) will be described.

Figure 2:
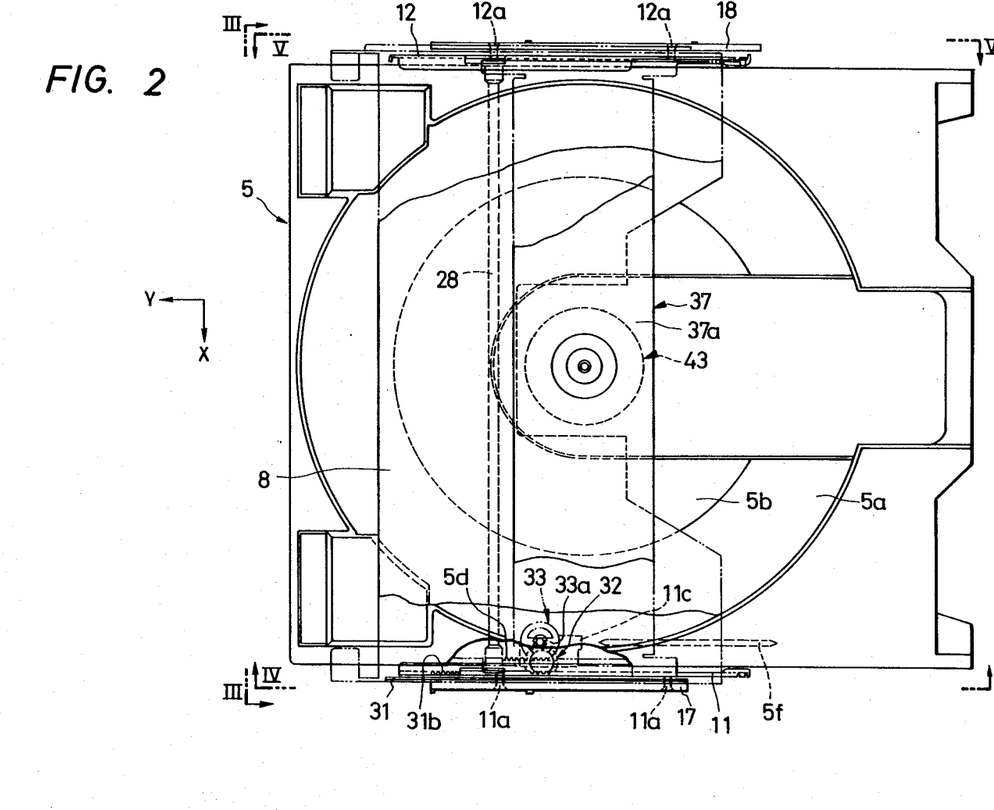
FIG. 2 is a plan view showing the internal construction of the disk player.

As shown in FIGS. 1 and 2, two shallow circular recesses 5a and 5b for receiving optical video disks about 30 cm and 20 cm in diameter respectively are formed coaxially in the upper surface of the carrier 5.

As shown in FIGS. 2 through 5, the disk player has a pair of rectangular-plate-shaped supporting members 11 and 12 made of steel plate on both sides of the carrier 5. That is, the supporting members support the carrier 5 with the aid of rollers 14 (FIG. 3) in such a manner that the carrier 5 is movable in parallel with the disk-bearing surface 14a of a turn table 14 (FIG. 3), i.e., the carrier 5 is movable back and forth (in the direction of the arrow Y and in the opposite direction).

Figure 6:
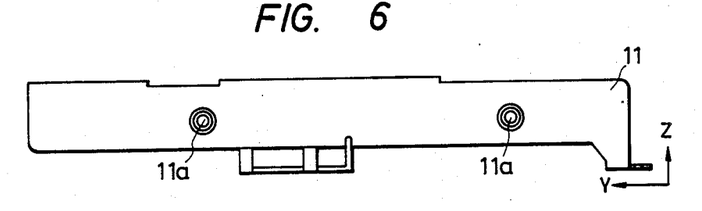
FIGS. 6 through 13 are diagrams showing parts of the internal constructions in detail.
Figure 7:
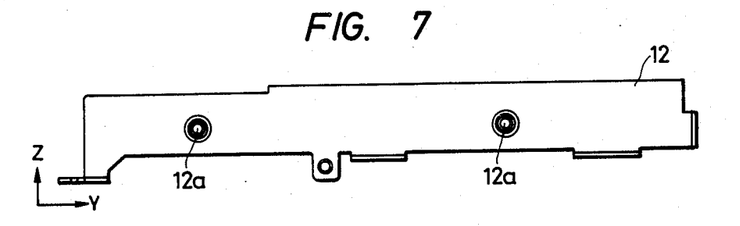

FIGS. 6 and 7 are side views showing the configurations of the supporting members 11 and 12 in detail, respectively.

As shown in FIGS. 2, and 4 through 7, a pair of pins 11a are extended from the outside of the supporting member 11 in such a manner that the pins 11a are spaced apart from each other in the direction of the arrow Y, and similarly a pair of pins 12a are extended from the outside of the supporting member 12 in such a manner that the pins 12a are spaced apart from each other in the direction of the arrow Y. These pins are movably insetted into L-shaped guide holes 8a (FIGS. 1, 4 and 5) formed in the chassis 8, respectively, so that the supporting members 11 and 12 are moved along the L-shaped guide holes. Each of the L-shaped guide holes 8a consists of a horizontal part extended horizontally, and a vertical part which is extended downwardly from the rear end of the horizontal part.

Figure 8:
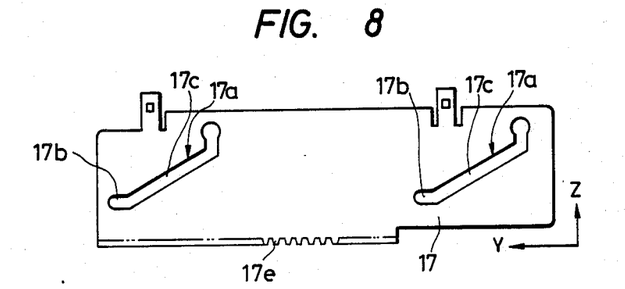
Figure 9:
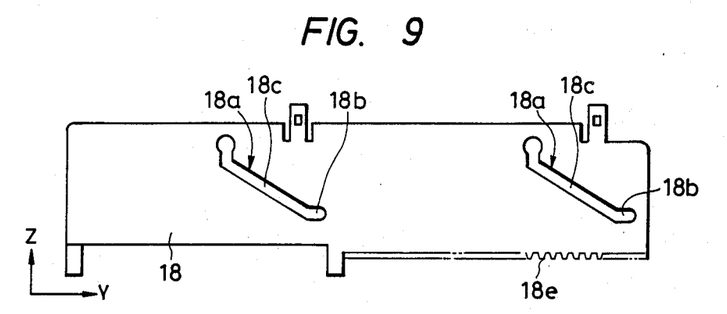

As shown in FIGS. 2 through 5, a pair of rectangular-plate-shaped movable members 17 and 18 are provided in such a manner that the L-shaped guide holes 8a are held between the supporting member 11 and the movable member 17 and between the supporting member 12 and the movable member 18. FIGS. 8 and 9 show the movable members 17 and 18 in more detail, respectively. The movable members 17 and 18 are mounted on the chassis 8 in such a manner that they are movable back and forth (in the direction of the arrow Y and in the opposite direction). The pins 11a and 12a extended from the outsides of the supporting members 11 and 12 are inserted into the L-shaped guide holes 8a formed in the chassis 8 and slidably engaged with cam holes 17a and 18a (FIGS. 4, 5, 8 and 9) formed in the movable members 17 and 18, respectively.

As is apparent from FIGS. 8 and 9, each of the cam holes 17a and 18a consists of a horizontal part (17b or 18b), and a sloped part (17c or 18c) which is obliquely upwardly from the rear end of the horizontal part. That is, these cam holes 17a and 18a are so shaped that, as the movable members 17 and 18 are moved back and forth (in the direction of the arrow Y and in the opposite direction) the carrier 5 together with the supporting members 11 and 12 are moved up and down (in the direction of the arrow Z and in the opposite direction).

Figure 3:
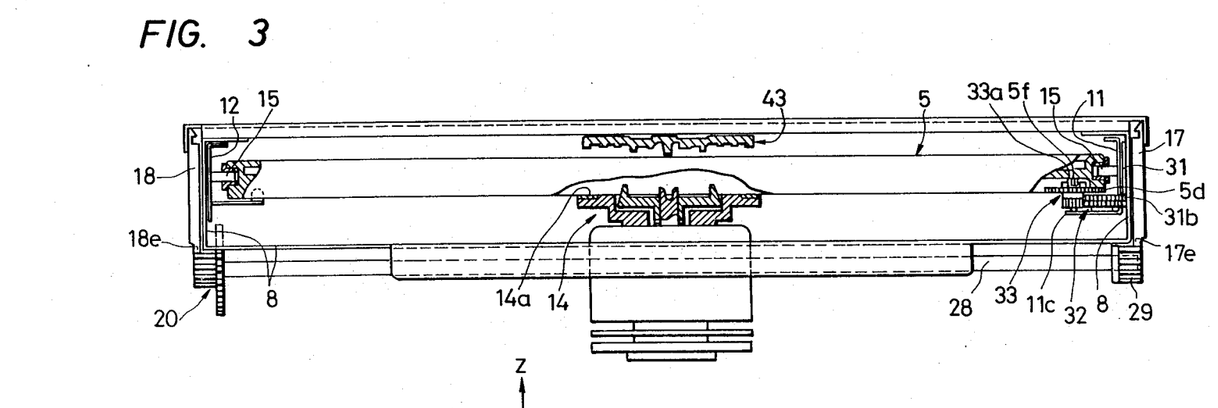
FIGS. 3 through 5 are side views, partly as sectional views, taken in the directions of the arrows III—III, IV—IV and V—V in FIG. 2, respectively.
Figure 5:
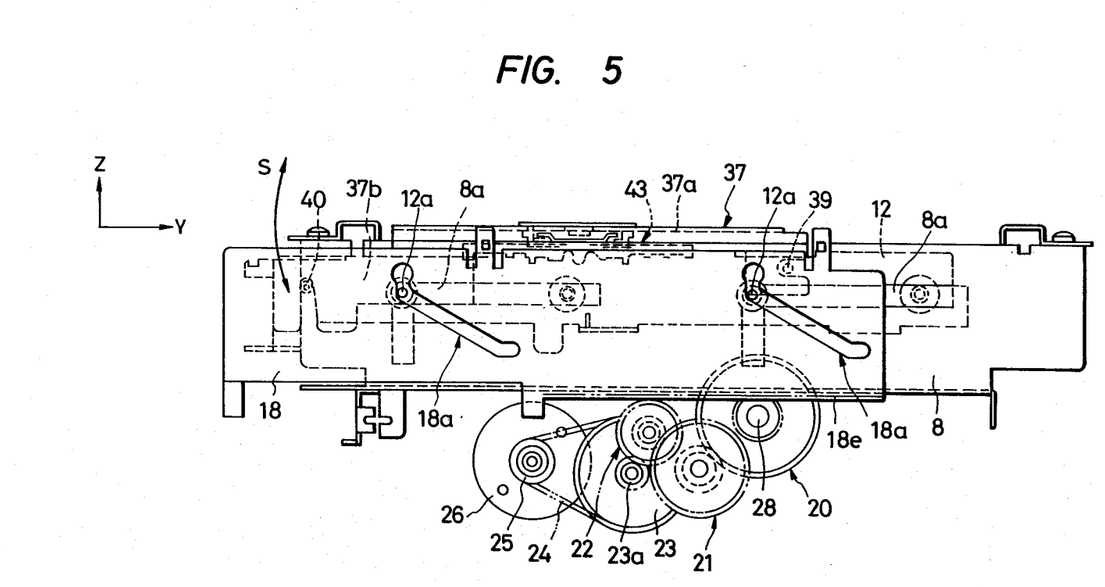

As shown in FIGS. 5, 8 and 9, racks 17e and 18e are formed in the lower edge portions of the pair of movable members 17 and 18, respectively. As shown in FIGS. 3 and 5, the rack 18e of the right-handed movable member 18 is engaged with the small gear of a double gear 20. The double gear 20 is coupled to the output shaft of an electric motor 26 through a double gear 21 whose small gear engages the large gear of the double gear 20, a double gear 22 whose small gear engages the large gear of the double gear 21, a pulley 23 having a gear 23a engaged with the large gear of the double gear 22, a belt 24, and a small pulley 25. As is apparent from FIGS. 2, 3 and 5, the double gear 20 is mounted on one end of a shaft 28, and a gear 29 is mounted on the other end. The gear 29 is engaged with the rack 17 formed in the left movable member 17. That is, the right and left movable members 18 and 18 are moved together by rotation of the motor 26.

The above-described double gears 20, 21 and 22, pulley 23, belt 24, small pulley 25, motor 26, shaft 28 and gear 29 form means for applying a drive force to the pair of movable members 17 and 18 (hereinafter referred to as "drive force applying means", when applicable). The pair of supporting members 11 and 12 and the chassis 8 having the L-shaped guide holes 8a form carrier form carrier moving means for moving the carrier 5 horizontally and vertically with movement of the movable members 17 and 18. Since the carrier moving means is made up of the components made of steel plates or the like, the player can be readily manufactured at low cost. The carrier moving means, the movable members 17 and 18, the drive force applying means (including the motor 26 etc.) form the carrier taking in and out means.

Figure 4:
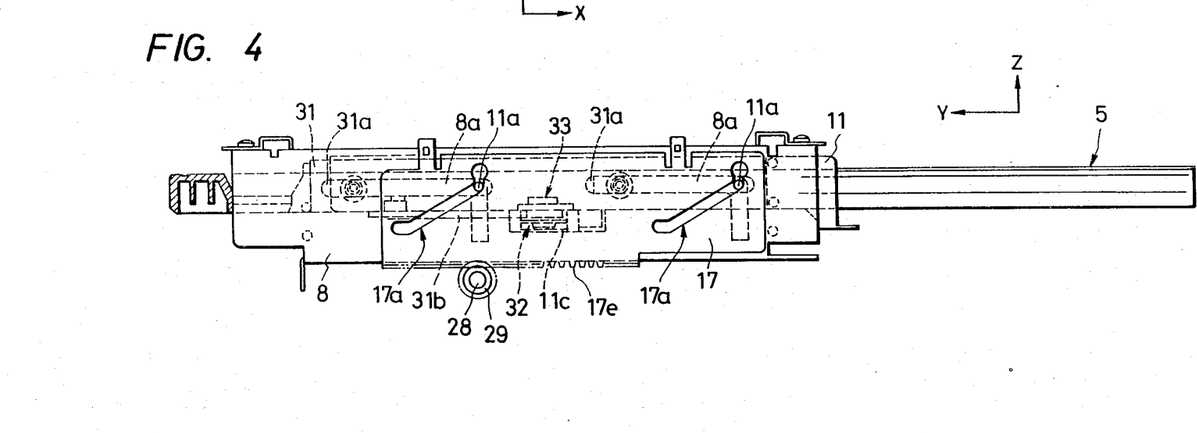
Figure 10:
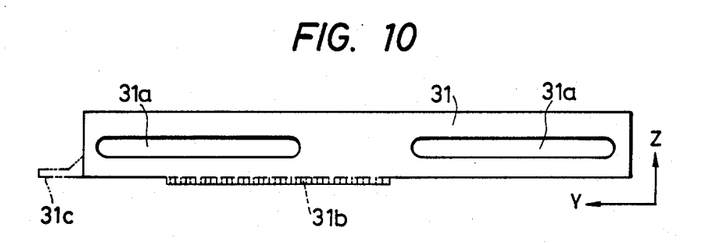

As shown in FIGS. 2, 3 and 4, a rectangular-plate-shaped rack member 31 is disposed between the chassis 8 and the supporting member 11 in such a manner that the rack member 31 is extended in the direction of the arrow Y. FIG. 10 is a side view of the rack member 31. The rack member 31 is movable only vertically (in the direction of the arrow Z and in the opposite direction) of the chassis 8. As shown in FIG. 10, a pair of elongated holes 31a (extended in the direction of the arrow Y) are formed in the rack member 31. The two pins 11a of the supporting member 11 are slidably engaged with the elongated holes 31a, respectively. That is, the rack member 31 is moved vertically together with the supporting member 11. As is apparent especially from FIG. 10, a rack 31b is formed along the lower edge of the rack member 31 in such a manner that it extends longitudinally of the rack member 31. As shown in FIGS. 2, 3 and 4, the rack 31b is engaged with the small gear of a double gear 32. The large gear of the double gear 32 is engaged with the small gear of a double gear 33, the large gear of which is engaged with a rack 5d formed in the carrier 5 in such a manner that the rack 5d is extended in the direction of movement of the carrier 5. These double gears 32 and 33 are mounted on a bracket 11c which is extended from the supporting member 11 to the right. Therefore, the double gears are movable vertically together with the supporting member 11.

The rack member 31, the rack 5d of the carrier 5, and the double gears 32 and 33 form a speed increasing mechanism for moving the carrier 5 at a speed a predetermined number times the speed of movement of the movable member 17 (or 18). The ratio of the speed of the movable member 17 (or 18) to the speed of the carrier 5 is determined from the numbers of teeth of the double gears 32 and 33, being 1:4 in the embodiment.

The speed increasing mechanism is included in the carrier moving means. Since the speed increasing mechanism is made up of the gears and the rack as was described above, the ratio of the speed of the movable member 17 (or 18) to the speed of the carrier 5 can be readily changed with low cost.

In the above-described embodiment, the rack member 31 is moved vertically together with the supporting member 11. However, the player may be so designed that the rack member 31 is fixed to the chassis 8. In this modification, the rack 31b of the rack member 31 should be wider than the range of movement of the double gear 33 which is moved vertically together with the supporting member 11 being engaged with the rack 31b.

Now, a clamp mechanism for clamping a disk at a playing position, i.e., on the turn table 14 (FIG. 3) will be described.

Figure 11:
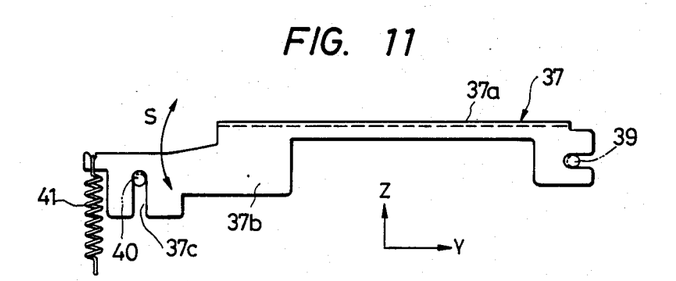

As shown in FIGS. 2 and 5, a holding member consisting of a rectangular-plate-shaped horizontal part 37a extended in the direction of the arrow X, and vertical parts 37b extended vertically from the horizontal part 37a. FIG. 11 is a side view showing the holding member 37 in detail. As is apparent from FIGS. 5 and 11, the front end portions of the vertical parts 37b of the holding member 37 are pivotally mounted on pins 37 embedded in the above-described supporting members 11 and 12. The pins 39 pivotally supporting the holding member 37 are extended in parallel with the disk bearing surface of the turn table. Therefore, the holding member 37 is swingable in a plane perpendicular to the disk bearing surface (as indicated by the arrow S). As shown in FIG. 11, a cut 37c having a predetermined curvature is formed in the other end portion of each of the vertical parts 37b, and is slidably engaged with a pin 40 (shown also in FIG. 5) to guide the swing of the holding member 37. The pins 40 are also embedded in the supporting members 11 and 12, respectively. As shown in FIG. 11 coil springs 41 are connected to the free end portions of the holding member 37 to urge the free end portions towards the turn table 14. As shown in FIGS. 2, 3 and 5, a disk-shaped depressing member 43 is rotatably mounted on the middle of the horizontal part 37a of the holding member 37.

The holding member 37, the coil springs 41 and the depressing member 43 form the clamping mechanism.

Figure 12:
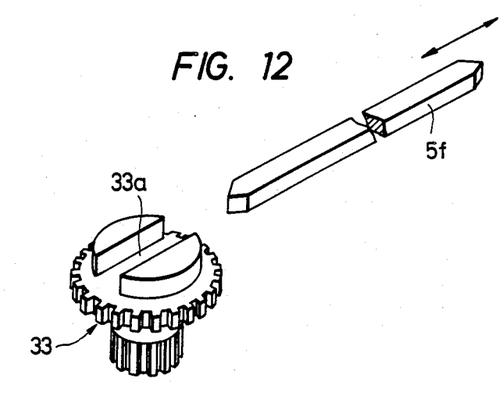

As shown in FIGS. 2, 3 and 12, a linear groove 33a is formed in the upper surface of the double gear, which is a part of the above-described speed increasing mechanism, in such a manner that the groove 33a is extended radially of the gear. On the other hand, a linear protrusion 5f is formed on the lower surface of the carrier 5 in such a manner that it is extended in the direction of movement of the carrier 5. The linear groove 33a and the linear protrusion 5f are complementary in configuration with each other so that they are engageable with each other. When, for instance during assembling of the disk player, the rack 5d of the carrier 5 is engaged with the large gear of the double gear 33, the linear protrusion 5f is fitted in the linear groove 33a, so that the double gear 33 is fixed at a predetermined rotational position, and therefore the positional deviation in engagement of the rack 5d from the double gear 33 is prevented. However, it should be noted that the linear protrusion 5f is disengaged from the linear groove 33a immediately before the rack 5d is engaged with the double gear 33.

Figure 13:
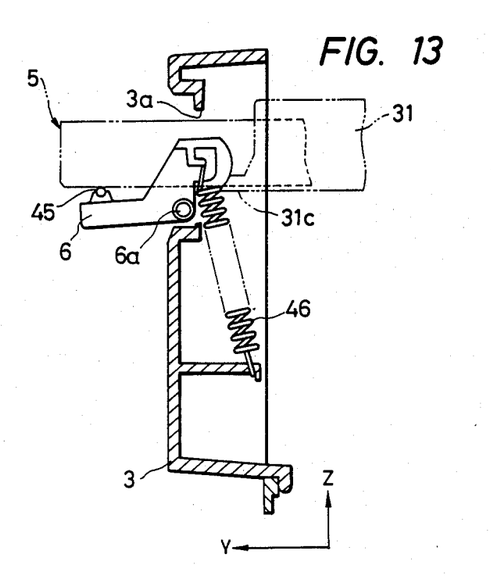

As shown in FIG. 13, the door 6 provided to close the opening 3a in the front panel 3 is swingably supported on a supporting shaft 6a and is urged by a coil spring 46 to close the opening 3a. The door 6 is swung by the carrier taking in and out means including a protrusion 31c provided at the front end portion of the rack member 31.

Figure 14:
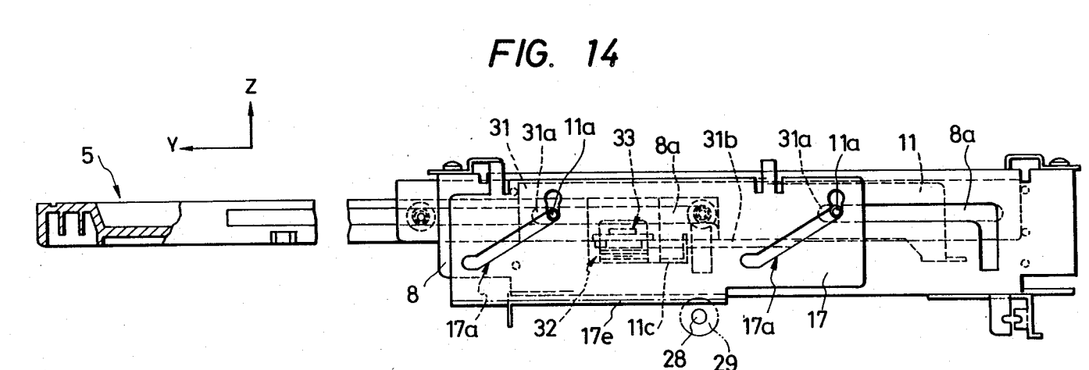
FIGS. 14, 15 and 16 are diagrams for a description of the operation of the disk player.
Figure 15:
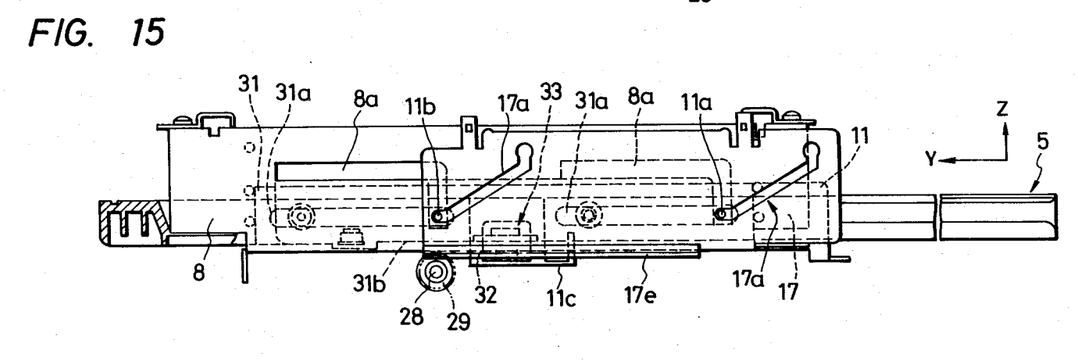
Figure 16:
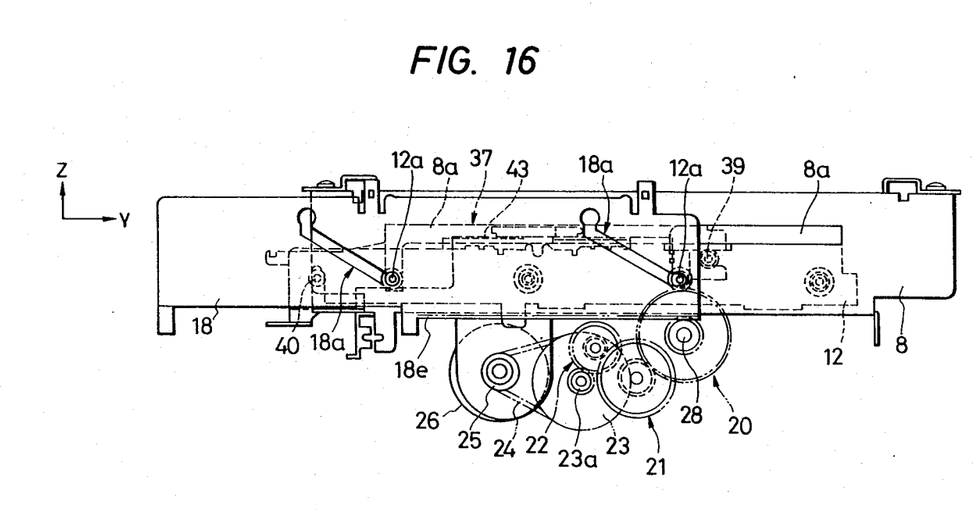

Now, the operation of the disk player thus constructed will be briefly described according to a playing procedure additionally with reference to FIGS. 14, 15 and 16.

As shown in FIGS. 1 and 14, the carrier 5 is taken out of the player housing 2, and a disk 4 is positioned in place on the carrier 5. The operation of taking the carrier 5 out of the player housing 2 will not be described here in detail, because it is completely opposite to an operation of taking it into the player housing (described below).

Under this condition, a loading button, one of the switches 7 (FIG. 1) is depressed. As a result the motor 26 (FIG. 5) is driven, and the right and left moving members 18 and 17 start moving backwardly (in the direction opposite to the direction of the arrow Y). Therefore, the pins 11a and 12a at the intersections of the cam holes 17a and 18a of the movable members 17 and 18 and the L-shaped guide holes 8a of the chassis 8, and accordingly the supporting members 11 and 12 are moved backwardly. As the supporting member 11 is moved backwardly, the two double gears 32 and 33 (FIG. 2) on the supporting member 11 are also moved backwardly. Since the double gear 32 is engaged with the rack 31b of the rack member 31, the double gear 32 is turned clockwise in FIG. 2 with the backward movement of the supporting member 11. Accordingly, the other double gear 33 is turned counterclockwise in FIG. 2. Because of this, the carrier 5 with the rack 5d engaged with the double gear is moved backwardly about four times as fast as the movable members 17 and 18.

As a result, the carrier 5 is positioned as shown in FIGS. 2 through 5. The motor 26 is further rotated, and the movable members 17 and 18 are further moved backwardly. Thus, as shown in FIGS. 15 and 16, the carrier 5 is moved downwardly together with the supporting members 11 and 12, so that the disk 4 is placed on the turn table 14 (FIG. 3) and clamped. Under this condition, the motor 26 is stopped. Thus, the disk can be played.

After the disk has been played, as was described before the motor 26 is rotated in the reverse direction, so that the carrier 5 is also moved in the reverse direction so as to be protruded out of the housing 2. Under this condition, the disk 4 is removed from the carrier 5.

In the above-described embodiment, the carrier 5 is moved horizontally and vertically; however, it is moved in directions different from those described above depending on the posture of the disk player installed. At any rate, the carrier 5 is moved in directions perpendicular to each other.

As was described in detail, the front loading disk player of the invention comprises: the carrier 5 for bearing a disk 4 to be played; and the carrier taking in and out means for moving the carrier out of and into the player housing to allow the loading and unloading of the disk 4. The carrier is a single member. The carrier taking in and out member comprises: the movable members 17 and 18 which are movably provided in the player housing; the drive force applying means (for instance the motor 26) for applying a drive force to the movable members; and the carrier moving means for moving the carrier horizontally and vertically with movement of the movable members.

As was described above, the carrier for supporting a disk is the single member which is moved in two directions, horizontal and vertical directions. The carrier moving means is also simple in construction, comprising the supporting members 11 and 12 and the chassis 8. Thus, the disk player is, as a whole, small in the number of components, and low in manufacturing cost.

In the front loading disk player of the invention, the carrier taking in and out means opens and closes the door 6 which is provided for the opening 3a of the player housing 2 through which the carrier is moved out of, the housing. Therefore, the carrier will not rub against the door, thus and will not produce any abnormal sounds.

As shown in FIG. 13, the door 6 for closing the opening portion 3a formed in the front panel 3 is rotatably supported to a support shaft 6a. Where thee bottom surface of the door is brought into contact with the carrier 5, a spherical member having a small frictional coefficient, such as a steel ball 45 is provided to extend from the door 6. The door 6 is biased by a coil spring 46 in the closing direction. When the carrier 5 performs a projective/retraction operations relative to the player housing, the carrier is moved with the door in contact therewith due to the biasing force thereon. The spherical member 45 reduces the friction between the door 6 and the carrier 5 to prevent any noise therebetween. Also, since the spherical ball 45 is provided at a front edge portion of the door 6, the door 6 is closed under the condition that the ball 45 is continuously held in contact with the carrier 5. Thus, the closing speed of the door's front edge is equal to that of the carrier 5, so that front end portion will not collide against front panel when the door is closed.

The member having the small frictional coefficient is not limited to the spherical ball but may be formed as a roller for example. Also, any type of rollers available on the market may be used as the spherical or cylindrical member.

What is claimed is:

1. A front loading disk player comprising:

a housing;

a unitary carrier for bearing a disk to be played;

carrier conveying means for conveying said carrier out of and into said housing through an opening formed in said housing, to permit the loading and unloading of said desk; and a door swingably provided to open and close said opening, said door being spring biased in the closing direction, said carrier conveying means comprising movable members having cammed grooves contained therein, said movable members being movably provided in said housing;

drive force applying means for applying a drive force to said movable members; and carrier moving means slidably connected to said cammed grooves of said movable members for moving said carrier horizontally and vertically with movement of said movable members, said door being opened and closed by said carrier conveying means wherein said door has a low friction member disposed thereon which abuts against said carrier such that when said carrier is conveyed into said housing said door being spring biased in the closing direction abuts against said carrier so as to be closed at the same rate of speed in which said carrier is conveyed such that said door is closed in a smooth manner.

2. A front loading disk player as claimed in claim 1, in which said member is spherical.

3. A front loading disk player as claimed in claim 1, in which said member is a roller.

* * * * *